3,494,370
EXPLOSIVE VALVE
William Wahl, Pacific Palisades, and Lloyd B. Campbell, Los Angeles, Calif., assignors, by mesne assignments, to William Wahl Corporation, Santa Monica, Calif.
Filed June 22, 1964, Ser. No. 376,855
Int. Cl. F16k 13/04, 17/14, 17/40
U.S. Cl. 137—68                                12 Claims This invention pertains to a normally closed valve to be driven to an open position by explosive force.

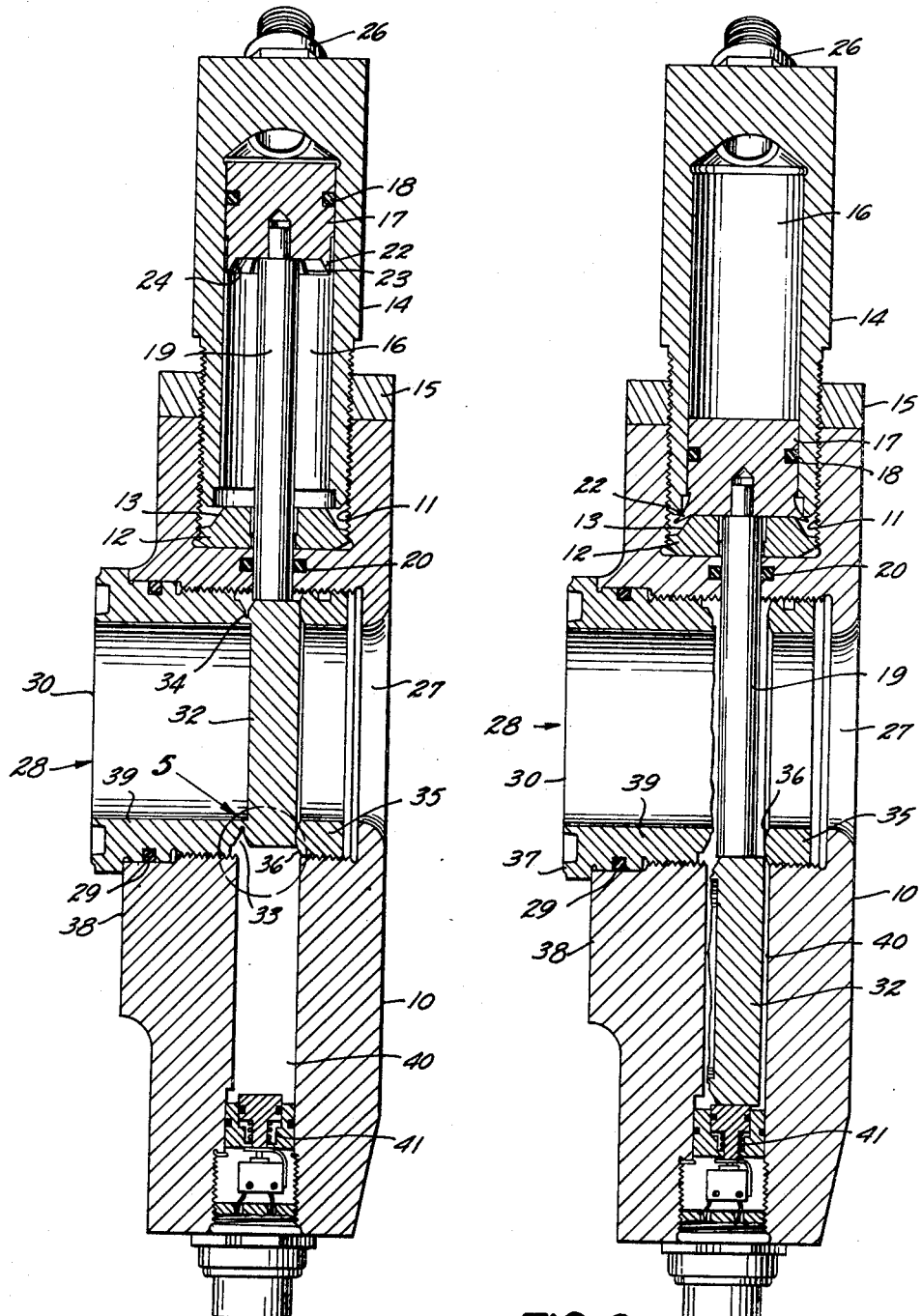

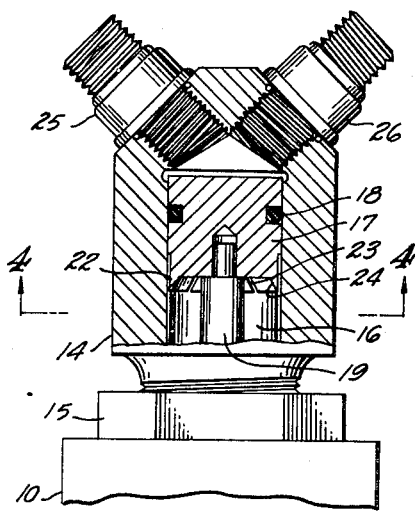
FIG.3
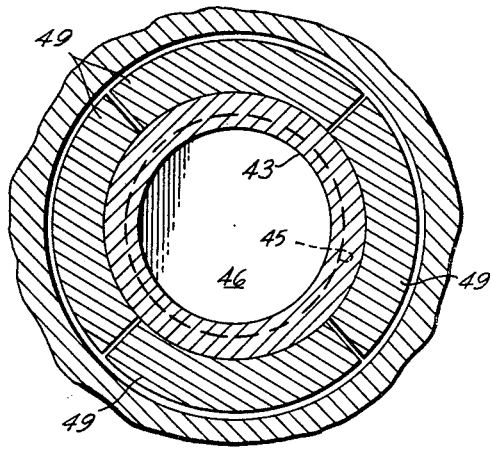
FIG.7
FIG.6
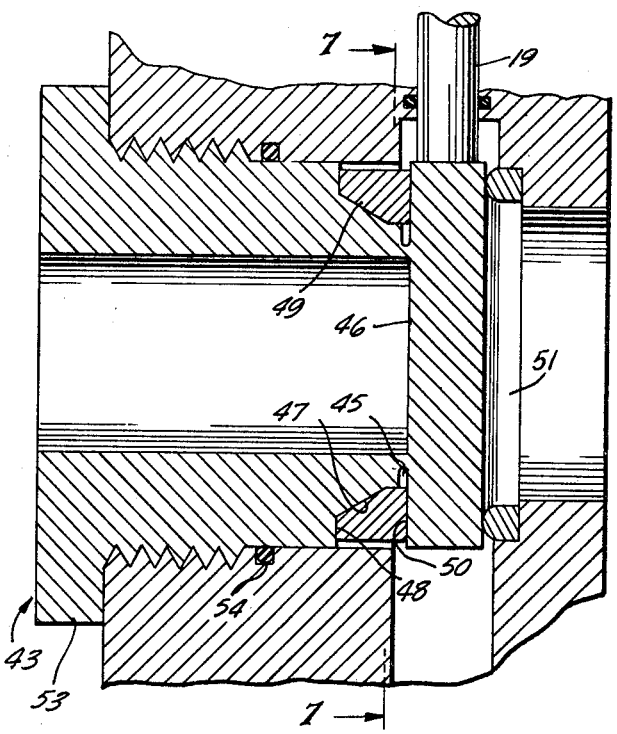
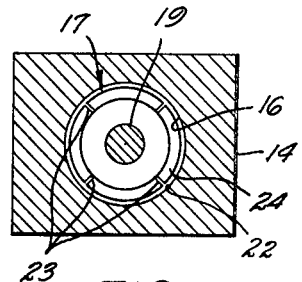
FIG.4
FIG.5
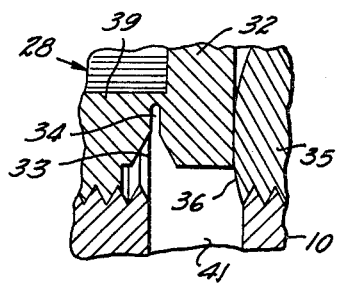
INVENTOR.
WILLIAM WAHL
LLOYD B. CAMPBELL
BY
*Gausewitz & Carr*
ATTORNEYS

United States Patent Office 3,494,370
Patented Feb. 10, 1970

The invention provides a rapidly operable explosive valve of high reliability and outstanding performance. Consequently, it is adapted for use in a variety of installations including those for military purposes and in-space vehicles. It can be used in fluid lines transmitting various chemicals in vew of the almost total lack of possible leakage at the valve. A particularly important aspect of the valve of this invention is its ability to withstand high line pressures while still permitting opening of the valve with a relatively low explosive force. The valve can be constructed to withstand high downstream as well as upstream pressures without failure. Moreover, the valve is devised to break cleanly so that there will be no fragments to be carried downstream and damage other equipment. Additionally, the valve becomes locked in the open position once the explosion has taken place so that the closure member cannot obstruct the free flow of fluid.

These features are accomplished by a structure that includes a shear nipple threaded into a valve body and formed as an integral part. A deep annular groove is adjacent the end wall of the shear nipple. This area is subjected to a compressive load by virtue of an annular member that bears against the shear member on its exterior wall opposite from the annular groove. This compressive force permits the annular groove to be deep so that the end wall of the shear nipple can be driven off by a relatively light explosive force. At the same time, the preloading by the ring precludes failure from large bursting pressures within the valve. If desired, the end wall of the shear nipple may be loaded on both sides so that the unit will withstand high downstream pressures as well as pressures on the upstream side. For this result, a split annular ring is fitted into the groove inwardly at the end wall of the shear tube. The deep annular groove permitted by this construction means that the valve breaks cleanly, and there will be no particles present to move downstream with the fluid. In addition, there is a lock on the piston that opens the valve, this being provided by an anvil washer which causes the bottom slotted edge of the piston skirt to force the skirt outwardly into an annular recess. The piston, therefore, holds the sheared wall in the open position after the explosion has taken place, preventing any return movement to the fluid path through the valve.

An object of this invention is to provide a fast acting reliable explosive valve.

Another object of this invention is to provide an explosive valve that withstands high pressures, yet opens with a relatively low explosive force.

A further object of this invention is to provide an explosive valve that can withstand great inlet pressures and also can withstand high back pressure without failure.

A still further object of this invention is to provide an explosive valve that breaks cleanly so that no particles will be carried downstream with the fluid released.

Yet another object of this invention is to provide an explosive valve that is positively held in the open position so that the fluid flow will be unobstructed.

These and other objects will become apparent from the following detailed description taken in connection with the accompanying drawing in which:

FIGURE 1 is a transverse sectional view of the valve of this invention in its normally closed position prior to firing the explosive charge;

FIGURE 2 is a view similar to FIGURE 1 with the valve open upon detonation of the explosive charge;

FIGURE 3 is a fragmentary sectional view of the upper portion of the explosion chamber showing the fittings for connection of the squibs, taken along line 3—3 of FIGURE 2;

FIGURE 4 is a transverse sectional view taken along line 4—4 of FIGURE 3, illustrating the slotted construction of the piston skirt;

FIGURE 5 is an enlarged fragmentary sectional view of the end portion of the shear nipple showing the detailed configuration of the annular groove and the engagement of the end wall with the annular thrust ring;

FIGURE 6 is a fragmentary sectional view of a modified version of the valve resistant to downstream pressures as well as upstream pressures; and FIGURE 7 is a transverse sectional view taken along line 7—7 of FIGURE 6.

With reference to the drawing, the device of this invention includes a valve body 10 having on one side a threaded opening 11. At the bottom of the opening 11 is an anvil washer 12 which is threaded into the opening 11 and is provided with an outwardly facing frustoconical surface 13. Preferably, this is inclined at around 45° with respect to the axis of the washer and the opening 11.

Outwardly of the anvil washer 12, and also threadably received in the opening 11, is a barrel, or cylinder, 14. A nut 15 is threaded on the exterior of the barrel 14 and engages the outer wall of the housing 10, locking the barrel 14 onto the housing.

Slidable within the bore 16 of the barrel 14 is a piston 17 sealed by means of O-ring 18. A straight rod 19 extends downwardly from the piston 17 through the barrel 14, the anvil washer 12 and an aligned opening in the housing 10, where it is sealed by means of O-ring 20. The skirt 22 of the piston 17 is provided with slots 23 and a frustoconical inner surface 24. The latter may be inclined at an angle of 30° with respect to the axis of the barrel.

Above the piston 17 and barrel 14 receives fittings 25 and 26, which are adapted to receive in turn squib connectors for providing the explosive charge to operate the piston 17.

Through the central part of the body 10 is an aperture 27 that at one end threadably receives a portion of the exterior wall of a shear nipple 28. The latter member is positioned within the opening 27 with its axis at right angles to the axis of the piston 17 and the rod 19. The periphery of the shear tube 28 is sealed with respect to the opening 27 in the valve body 10 by an O-ring 29. The outer end 30 of the shear member is adapted for connection to the fluid line, forming the upstream side of the valve. The downstream connection is made to the valve body at the end 31 of the opening 27.

The shear nipple 28 is a substantially cup-shaped member that includes a radial end wall 32, which is located in alignment with, and on its circumferential surfaces engaged by the end of, the piston rod 19.

Adjacent the end wall 32 the outer circumference of the shear nipple 28 is provided with an annular groove 33. This groove is relatively wide at its exterior, but tapers inwardly and includes a narrow inner section 34. The groove 33 is deep and extends through a major portion of the wall of the shear nipple.

The end of the shear nipple within the valve body 10 is given a compressive load by means of an annular back-up ring 35. This element is threadably received in the opening in the valve body and includes an arcuate face 36 that engages the outer portion of the end wall 32.

By this construction, therefore, it is possible to impart any desired precompression on the end of the shear tube 28. The amount of load thus given on the shear element is dependent upon the axial position of the annular back-up member 35, which may be adjusted by its threaded connection to the housing 10. Typically, the end wall 32 will contact the outer face 36 .001 inch before the shear tube bottoms out in its connection to the valve body 10 through the engagement of flange 37 and the outer radial face 38 of the housing. Consequently, the shear tube is actually compressed by .001 inch upon installation, and a considerable load is developed against the end wall 32, urging it toward the circumferential wall 39 of the shear nipple.

Upon explosion of the valve resulting from the firing of the squibs connected to the fittings 25 and 26, the piston 17 is driven downwardly which, through rod 19, shears off the end 32 of the shear nipple 28. The failure naturally occurs at the location of the groove 33 where the shear member is considerably weakened by the reduction in area to resist the shear force. The end 32 is driven downwardly into a recess 40 in the valve body that is aligned with the end wall 32 in its installed position. At this point, the severed end wall strikes indicating element 41, which transmits a signal to establish that the valve in fact has been opened.

When the rod moves downwardly, the end wall 32 breaks cleanly and without fragmentation by virtue of the deep cut at the groove 33. The parts do not pulverize, and there are no fragments to be carried downstream by the fluid released. Moreover, the deep groove 33 allows the valve to be blown to the open position by a relatively low explosive force. The resistance to shear is not great by virtue of the fact that the groove severs most of the wall of the shear tube, and there is little shear area to withstand the explosive forces. This reduction in wall thickness that allows the clean severing of the end wall and the reduced explosive forces can be realized only through the provision of the precompressive load on the shear member. Thus, the backup ring 35, by urging the end wall into the circumferential wall of the shear nipple, provides a means to withstand the bursting forces within the valve on the upstream side. Hence, the valve can withstand high pressures without breakage, even with the presence of the deep annular groove 33. It is easily possible to design the valve to withstand internal pressures of up to 6,000 p.s.i. gauge, while having an opening time of .01 second and a perfectly clean break upon shearing. Without the axial load from the back-up ring 35, however, the deep groove 33 would weaken the valve so that it would have little resistance to upstream pressures.

When the piston is driven downwardly in opening the valve, the skirt 22 strikes the upper surface of the anvil washer 12. Consequently, the frustoconical surface 13 of the washer 12 is brought into engagement with the similarly contoured surface 24 of the piston skirt. Surface 13 is more steeply inclined than the surface 24 so that the washer readily enters the piston skirt. This causes a wedging action which, by virtue of the slots 23, allows expansion of the piston skirt. As a result, the skirt is forced outwardly into the annular recess 42 at the bottom of the opening 11 inwardly of the end of the barrel 14. The barrel 14 thereby provides a barrier that precludes upward movement of the piston 17 once the explosion has taken place. This means that the gas pressures and other forces cannot return the piston at the upper position, and the end wall 32 can never move into the path of the fluid stream. Vibrational forces, gravity forces and all other loads will have no effect on the position of the parts, which will remain as shown in FIGURE 2 after the valve has opened.

After firing, the piston can be removed from below and replaced with a new unit. Thus, the valve body remains intact and can be used upon supplying a new shear tube and piston assembly.

By this construction, therefore, the valve opens with a relatively low explosive force cleanly and with great rapidity and without danger of obstruction to the fluid flow after the valve opening has taken place.

The valve may be constructed to withstand high downstream pressures as well as high upstream pressures when modified as indicated in FIGURES 6 and 7. Here there may be seen a shear nipple 43 similar to the member 28 but provided with a groove 44, which is wider at its periphery than the groove 33. As before, however, it has a narrow portion 45 extending inwardly through most of the circumferential wall adjacent the end 46 of the shear nipple. The outer portion of the groove 44 includes surface 47 inclined outwardly away from the end wall 46, leading to a radial surface 48. Within the enlarged portion of the groove 44 is a segmented ring 49. This ring is closely fitted into the groove 44 to contact surfaces 47 and 48 as well as radial surface 50 adjacent the end wall 46. It is made in pieces in order that it can be inserted into the groove 44 and extend around its entire circumference.

The outer surface of the end wall 46 is contacted by a ring 51 held on a shoulder formed in the valve body 52. This occurs when the shear nipple 43 is threaded into the valve body 52, bringing flange 53 into contact with the outer face of the valve body. O-ring 54 seals the exterior of shear tube 43 with respect to the valve body.

This construction permits compressive loading on both sides of the end wall 46. When the shear nipple 43 is tightened into the valve body 52, the annular member 43 reacts against the end wall 45, pushing inwardly on this wall. This force is absorbed by the segmented ring 49 which is supported against this axial load by the circumferential wall of the shear nipple 43. This means that the outer periphery of the end wall 46 is gripped tightly on both sides between the annular members 49 and 51. Hence, it is retained firmly in place against either upstream or downstream loads imposed in the fluid line. Therefore, both inlet and reverse pressures can be withstood without causing premature failure despite the deep groove 44 at the end wall 46. Nevertheless, resistance to a shearing force is relatively low so that the valve opens rapidly, cleanly and with a minimum of explosive pressure.

The foregoing detailed description is to be clearly understood as given by way of illustration and example only, the spirit and scope of this invention being limited solely by the appended claims.

What is claimed is:

1. A normally closed valve comprising
 a tubular member adapted for connection in a fluid line,
  said tubular member having a peripheral wall,
 an end wall extending across and closing one end of said tubular member for precluding flow of fluid through said tubular member,
  said tubular member and end wall having a peripheral weakened portion for causing said end wall to be shearable from said tubular member upon the exertion of a relatively low shear force on said end wall,
   thereby to permit fluid flow through said tubular member,
 means for exerting such a shear force on said end wall, and means outwardly of the central portion of said end wall engaging the exterior of said end wall at the portion thereof opposite said peripheral wall of said tubular member for forcing said end wall inwardly with respect to said tubular member for providing resistance to internal fluid pressures regardless of said weakened portion.

2. A normally closed valve comprising a tubular member adapted for connection to a fluid-transmitting line,
 said tubular member having a peripheral wall, an end wall extending across and closing one end of said tubular member for precluding flow of fluid through said tubular member,
said end wall being integrally formed with said tubular member,
said tubular member having a peripheral weakened portion adjacent said end wall,
said portion being frangible upon the exertion of a relatively low shear force on said end wall,
whereby said end wall is removable for allowing fluid flow through said tubular member,
means for exerting such a shear force on said end wall, and means outwardly of the central portion of said end wall engaging the exterior of said end wall at the portion thereof opposite said peripheral wall of said tubular member for axially forcing said end wall toward said tubular member for providing said tubular member with a resistance to internal fluid pressures despite pressure of said weakened portion.

3. An explosive valve device comprising
a tubular member having a circumferential wall,
one end of said tubular member being adapted for connection in a fluid passage to provide a fluid inlet to said tubular member,
an end wall extending across the other end of said tubular member for closing off said other end and precluding flow of liquid through said tubular member.
said end wall being integrally formed with said tubular member,
said tubular member and end wall being provided with a peripheral groove adjacent said end wall for thereby providing a weakened portion frangible upon the exertion of a relatively low shear force on said end wall,
a valve body receiving said tubular member,
means in said valve body for exerting such a shear force on said end wall,
and stationary annular means in said valve body outwardly of the central portion of said end wall engaging the exterior of the peripheral portion of said end wall opposite said circumferential wall and exerting an axial inward force on said end wall urging said end wall toward said circumferential wall for providing said tubular member with a resistance to relatively high internal forces regardless of the presence of said peripheral groove.

4. A device as recited in claim 3 in which said means for urging said end wall toward said circumferential wall includes
an annular member received in said valve body substantially in alignment with said circumstantial wall,
said annular member having a face adjacent said end wall in engagement with said end wall.

5. An explosive valve device comprising
a valve body,
said valve body having a passageway therethrough,
a stationary annular member in said passageway,
a shear tube in said passageway,
said shear tube including an integrally formed end wall for closing off one end of said shear tube, the opposite end of said shear tube being adpated for connection in a fluid line as the upstream side of said valve,
said shear tube being threadedly received in said passageway and urging the periphery of said end wall against said annular member,
whereby said annular member reacts against said end wall imparting an axial compression in said shear tube,
said shear tube having an annular groove therein adjacent said end wall for thereby providing a fragible portion resistant to relatively low shear forces,
said axial compression providing said shear tube with resistance to internal pressure despite said frangible portion,
and explosively driven means engaging one side of said end wall
and movable with respect to said end wall to shear said end wall from said shear tube,
thereby to open said valve.

6. A normally closed valve comprising
a tubular member adapted for connection in a fluid line,
an end wall extending across and closing one end of said tubular member for precluding flow of fluid through said tubular member,
said tubular member and end wall having a peripheral weakened portion for causing said end wall to be shearable from said tubular member upon the exertion of a relatively low shear force on said end wall,
thereby to permit fluid flow through said tubular member,
means for exerting such a shear force on said end wall,
means for forcing said end wall inwardly with respect to said tubular member for providing resistance to internal fluid pressures regardless of said weakened portion, and means for absorbing forces on said end wall exerted inwardly with respect to said tubular member
for providing said end wall with resistance to fluid pressures on the exterior thereof.

7. An explosive valve device comprising
a tubular member having a circumferential wall,
one end of said tubular member being adapted for connection in a fluid passage to provide a fluid inlet to said tubular member,
an end wall extending across the other end of said tubular member for closing off said other end and precluding flow of liquid through said tubular member,
said end wall being integrally formed with said tubular member,
said tubular member and end wall being provided with a peripheral groove adjacent said end wall for thereby providing a weakened portion frangible upon the exertion of a relatively low shear force on said end wall,
a valve body receiving said tubular member,
means in said valve body for exerting such a shear force on said end wall,
annular means in said valve body exerting an axial inward force on said end wall urging said end wall toward said circumferential wall for providing said tubular member with a resistance to relatively high internal forces regardless of the presence of said peripheral groove,
said annular means including an annular member received in said valve body substantially in alignment with said circumferential wall,
said annular member having a face adjacent said end wall in engagement with said end wall,
and a back-up member received in said peripheral groove between said end wall and said circumferential wall
for withstanding reverse pressures on said end wall.

8. An explosive valve device comprising
a valve body,
said valve body having a passageway therethrough,
an annular member in said passageway,
a shear tube in said passageway,
said shear tube including an integrally formed end wall for closing off one end of said shear tube, the opposite end of said shear tube being adapted for connection in a fluid line at the upstream side of said valve, said shear tube being threadably received in said passageway and urging the periphery of said end wall against said annular member, whereby said annular member reacts against said end wall imparting an axial compression in said shear tube, said shear tube having an annular groove therein adjacent said end wall for thereby providing a frangible portion resistant to relatively low shear forces, said axial compression providing said shear tube with resistance to internal pressure despite said frangible portion, explosively driven means engaging one side of said end wall and movable with respect to said end wall to shear said end wall from said shear tube, thereby to open said valve, and a back-up member in said peripheral groove for withstanding said compressive forces and giving said shear tube resistance to reverse pressures.

9. A device as recited in claim 8 in which said back-up member comprises a segmented ring closely fitted within said annular groove.

10. An explosive valve device comprising
a valve body,
said valve body having a passageway therethrough,
an annular member in said passageway,
a shear tube in said passageway,
said shear tube including an integrally formed end wall for closing off one end of said shear tube, the opposite end of said shear tube being adapted for connection in a fluid line at the upstream side of said valve,
said shear tube being threadably received in said passageway and urging the periphery of said end wall against said annular member,
whereby said annular member reacts against said end wall imparting an axial compression in said shear tube,
said shear tube having an annular groove therein adjacent said end wall for thereby providing a frangible portion resistant to relatively low shear forces,
said axial compression providing said shear tube with resistance to internal pressure despite said frangible portion,
and explosively driven means engaging one side of said end wall
and movable with respect to said end wall to shear said end wall from said shear tube, thereby to open said valve,
said explosively driven means including
a barrel,
a piston means in said barrel,
said piston means including a rod engaging the periphery of said end wall and being movable in said barrel toward said end wall,
whereby said rod causes said shearing of said end wall,
said piston means having a skirt,
and a wedge member in said barrel engageable with the inner surface of said skirt upon said movement of said piston means for forcing said skirt radially outwardly,
said barrel including a recess adjacent said wedge member for receiving said skirt when so forced outwardly,
whereby said skirt is locked, said piston is prevented from reverse movement and said rod holds said end wall away from said tubular member.

11. An explosive valve comprising
a valve body having an opening therethrough,
a tubular member in said opening,
said tubular member having
a cylindrical side wall,
an open outer end for providing an inlet to said valve,
and an integrally formed closed opposite end wall forming a closure for said valve,
a cylinder on one side of said opening,
a piston in said cylinder adapted for movement through a stroke in response to an explosive force in said cylinder,
a rod carried by said piston,
said rod being at right angles to the axis of said tubular member
and engaging the circumference of said end wall,
whereby when said piston is driven by an explosive force said rod exerts a shear force on said end wall,
said tubular member having a relatively deep annular groove in the circumference thereof adjacent said end wall
for providing a relatively low resistance to said shear force and permitting said piston and rod to drive said end wall from said tubular member upon the exertion of an explosive force,
said valve body having a receptacle aligned with said end wall on the opposite side thereof from said rod
for receiving said end wall upon the shearing of said end wall from said tubular member,
an annular member in said opening in said valve body
engaging outer peripheral portions of said end wall and urging said end wall inwardly toward said circumferential wall
for providing said tubular member with resistance to fluid pressure therein reacting outwardly on said end wall,
and a segmented annular member in said annular groove,
said segmented annular member having a first face engaging said end wall at said groove,
and a second face engaging said circumferential wall at said groove,
whereby said segmented member provides a back-up ring for cooperating with said first-mentioned annular member and gripping both sides of the periphery of said end wall to provide said end wall with resistance to failure from both upstream and downstream fluid pressures thereon.

12. An explosive valve comprising
a valve body having an opening therethrough,
a tubular member in said opening,
said tubular member having
a cylindrical side wall,
an open outer end for providing an inlet to said valve,
and an integrally formed closed opposite end wall forming a closure for said valve,
a cylinder on one side of said opening,
a piston in said cylinder adapted for movement through a stroke in response to an explosive force in said cylinder,
a rod carried by said piston,
said rod being at right angles to the axis of said tubular member
and engaging the circumference of said end wall,
whereby when said piston is driven by an explosive force said rod exerts a shear force on said end wall,
said tubular member having a relatively deep annular groove in the circumference thereof adjacent said end wall,
 for providing a relatively low resistance to said shear force and permitting said piston and rod to drive said end wall from said tubular member upon the exertion of an explosive force,
said valve body having a receptacle aligned with said end wall on the opposite side thereof from said rod
 for receiving said end wall upon the shearing of said end wall from said tubular member,
and a stationary annular member in said opening in said valve body
 engaging outer peripheral portions of said end wall opposite said cylindrical side wall and urging said end wall inwardly toward said circumferential wall for providing said tubular member with resistance to fluid pressure therein reacting outwardly on said end wall.

References Cited

UNITED STATES PATENTS 3,111,133   11/1963   Fulton et al. _____ 137—68

FOREIGN PATENTS 544,659   1956   Italy.

WILLIAM F. O'DEA, Primary Examiner

RICHARD GERARD, Assistant Examiner

U.S. Cl. X.R.

220—47